(12) United States Patent
Urgese et al.

(10) Patent No.: US 12,532,388 B2
(45) Date of Patent: Jan. 20, 2026

(54) METHOD AND SYSTEM TO CONTROL A QR-INVERTER IN A INDUCTION COOKING APPLIANCE

(71) Applicant: ELECTROLUX APPLIANCES AKTIEBOLAG, Stockholm (SE)

(72) Inventors: Emanuel Urgese, Forli (IT); Massimo Nostro, Forli (IT); Alex Viroli, Forli (IT); Massimo Zangoli, Forli (IT); Filippo Martini, Forli (IT); Fabio Angeli, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 865 days.

(21) Appl. No.: 17/782,292

(22) PCT Filed: Nov. 30, 2020

(86) PCT No.: PCT/EP2020/083840
§ 371 (c)(1),
(2) Date: Jun. 3, 2022

(87) PCT Pub. No.: WO2021/115809
PCT Pub. Date: Jun. 17, 2021

(65) Prior Publication Data
US 2023/0007740 A1 Jan. 5, 2023

(30) Foreign Application Priority Data
Dec. 13, 2019 (EP) .................................. 19216336

(51) Int. Cl.
*H05B 6/12* (2006.01)
*H02M 7/523* (2006.01)
*H05B 6/06* (2006.01)

(52) U.S. Cl.
CPC .......... *H05B 6/1254* (2013.01); *H02M 7/523* (2013.01); *H05B 6/065* (2013.01)

(58) Field of Classification Search
CPC ....... H02M 7/523; H05B 6/062; H05B 6/065; H05B 6/1254
(Continued)

(56) References Cited

U.S. PATENT DOCUMENTS 10,477,626 B2 * 11/2019 Tran ......................... H03K 5/19
2018/0176998 A1 6/2018 Nam et al.

FOREIGN PATENT DOCUMENTS

EP 2999306 3/2016
WO 2004107819 12/2004
(Continued)

OTHER PUBLICATIONS

International Search Report and Written Opinion for PCT/EP2020/083840, dated Feb. 11, 2021, 8 pages.

*Primary Examiner* — Quang T Van
(74) *Attorney, Agent, or Firm* — Chrisman Gallo Tochtrop LLC

(57) ABSTRACT

Method to control a quasi-resonant inverter (13) in an induction cooking appliance (1) provided with an induction heating coil (4). A switching device (21) is electrically connected to the induction heating coil (4) by a node (20) having a first voltage (VC(t)) which is indicative of the voltage across the power switching device (21). The method includes: providing to the switching device (21) an enabling signal (K1) comprising a plurality of pulses, in order to switch-on and switch-off the switching device (21) for a switch-on period (tON) and a switch-off period (tOFF), determining a second voltage (VCmin) indicative of the minimum value of the first voltage (VC(t)) during the switch-off period (tOFF), regulating the switch-off period (tOFF) based on the second voltage (VCmin), and regulating (Continued)

the enabling signal (K1) based on the regulated switch-off period (tOFF).

14 Claims, 5 Drawing Sheets

(58) Field of Classification Search
USPC ................ 219/660, 661, 664, 665, 670, 672
See application file for complete search history.

(56) References Cited

FOREIGN PATENT DOCUMENTS

| | | |
|---|---|---|
| WO | 2012089707 | 7/2012 |
| WO | 2014090864 | 6/2014 |

* cited by examiner

METHOD AND SYSTEM TO CONTROL A QR-INVERTER IN A INDUCTION COOKING APPLIANCE

BACKGROUND OF THE INVENTION

Field of Invention

The present invention generally relates to the field of induction cooking appliances. More specifically, the present invention relates to controlling a quasi-resonant inverter (hereinafter QR-inverter) in an induction cooking appliance.

Overview of the Related Art

Induction cooking appliances for preparing food are well-known household devices, which are conveniently efficient if compared with traditional gas or electric cooking appliances, because on the one side, they are accurate in controlling the cooking temperature and, on the other side, give a uniform cooking of the food.

Induction cooking appliances typically comprise: a cooking surface provided with one or more cooking zones designed to heat loads, i.e. pieces of cookware containing food, placed on the cooking surface, and a number of induction heating coils, which are associated with the cooking zones and generate time-varying magnetic fields inducing eddy current in the loads. The internal resistances of loads cause the induced eddy currents to generate heat in loads itself.

Generally, the induction coils are selectively operable to be fed by an alternating current (hereinafter indicated with AC current), which is provided by an electronic control system. The electronic control system generally comprises an inverter circuit providing the AC current to the corresponding induction coil, and an electronic control unit, which is configured to control the inverter circuit to vary the frequency of AC current flowing in the induction coil in order to regulate the electric power transferred from the inverter circuit to the load, i.e. the pieces of cookware containing food, based on a target cooking temperature.

Some kind of inverter circuits have a quasi-resonant topology/architecture, i.e. QR inverter circuits, wherein a switching section includes a single power switching device, such as a IGBT-switch (acronym of Insulated Gate Bipolar Transistors), which receives a pulsed enabling signal from a driver unit controlled in turn by the electronic control unit.

The induction cooking appliances provided with QR inverter circuits are particularly affected by losses of the IGBT-switch, which may reduce life-time of the inverter.

US20180176998 discloses a method for evaluating the necessary switch-on duration for making zero-voltage switching of a quasi-resonant inverter in an induction cooktop. The method includes: providing a pulse to turn a switching element associated with the quasi-resonant inverter, determining the peak voltage, i.e. the maximum voltage, across the switching element during the switch-off duration, determining whether the peak voltage across the switching element is greater than a threshold for the switch-off duration, and finally, when the peak voltage across the switching element is greater than the threshold, determining that the switch-on duration is sufficient for zero-voltage switching of the switching element.

SUMMARY OF THE INVENTION

Applicant has found that it would be advantageous to provide an induction cooking appliance having a control unit, which is configured to control the switching device of the QR inverter circuit in order to reduce the switching losses of the switching device so as to extend the time-life of the switching device and consequently time-life of the inverter circuit.

It is an object of the present invention to provide a method and a system for controlling a switching device of a QR inverter circuit of an induction cooking appliance.

According to an aspect, the present invention relates to a method to control a quasi-resonant inverter in an induction cooking appliance provided with at least an induction heating coil, the quasi-resonant inverter comprises a switching device electrically connected to said induction heating coil by a node having a first voltage which is indicative of the voltage across said power switching device, the method comprising the step: of providing to said switching device an enabling signal comprising a plurality of pulses, in order to switch-on and switch-off said switching device for a switch-on period and a switch-off period, determining a second voltage indicative of the minimum value of said first voltage during said switch-off period, regulating said switch-off period based on said second voltage, and regulating said enabling signal based on said regulated switch-off period.

Preferably, the method further comprises the steps of: determining a third voltage being indicative of the value of said first voltage about at the end of said switch-off period, and increasing said switch-off period if said third voltage is greater than said second voltage, and said first voltage is decreasing.

Preferably, the method further comprises the step of: decreasing said switch-off period if said third voltage is greater than said second voltage and said first voltage is increasing.

Preferably, the method further comprises the steps of: increasing said switch-on period if said second voltage is greater than a first voltage threshold, and regulating said switch-on period of said enabling signal based on said increased switch-on period.

Preferably, the method further comprises the steps of: determining a fourth voltage indicative of the maximum value of said first voltage during said switch-off period, and stop the operating of said quasi-resonant inverter if said fourth voltage is greater than a second voltage threshold.

The present invention further relates to an electronic control system for controlling at least a heating coil of an induction cooking appliance, the electronic control system comprises: a quasi-resonant inverter provided with: a switching device electrically connected to said induction heating coil by a node having a first voltage which is indicative of the voltage across said switching device, and a driver unit configured to provide to said switching device an enabling signal comprising a plurality of pulses, in order to switch-on and switch-off said switching device for a switch-on period and a switch-off period, said electronic control system comprises control means configured to: control said driver unit in order to regulate said enabling signal, determine a second voltage indicative of the minimum value of said first voltage during said switch-off period, regulate said switch-off period based on said second voltage, and regulate said enabling signal based on said regulated switch-off period.

Preferably, said control means are further configured to determine a third voltage indicative of the value of said first voltage about at the end of said switch-off period, and increase said switch-off period, if said third voltage is greater than said second voltage, and said first voltage is decreasing.

Preferably, said control means are further configured to decrease said switch-off period if said third voltage is greater than said second voltage and said first voltage is increasing.

Preferably, said control means are further configured to increase said switch-on period if said second voltage is greater than a first voltage threshold, and regulate said switch-on period of said enabling signal (K1) based on said increased switch-on period.

Preferably, said control means are further configured to determine a fourth voltage which is indicative of the maximum value of said first voltage during said switch-off period, and stop the operating of said quasi-resonant inverter, if said fourth voltage is greater than a second voltage threshold.

The present invention further relates to a induction cooking appliance comprising at least a an induction heating coil, a quasi-resonant inverter provided with: a switching device which is electrically connected to said induction heating coil by a node having a first voltage which is indicative of the voltage across said switching device, and a driver unit configured to provide to said switching device an enabling signal comprising a plurality of pulses, in order to switch-on and switch-off said switching device for a switch-on period and a switch-off period, an electronic control system comprising control means configured to control said driver unit in order to regulate enabling signal, control means configured to: determine a second voltage indicative of the minimum value of said first voltage during said switch-off period, regulate said switch-off period based on said second voltage, and regulate said enabling signal based on said regulated switch-off period.

Preferably, the control means are further configured to determine a third voltage indicative of the value of said first voltage about at the end of said switch-off period, increase said switch-off period if said third voltage is greater than said second voltage, and said first voltage is decreasing.

Preferably, said control means are further configured to decrease said switch-off period if said third voltage is greater than said second voltage and the first voltage about at the end of said switch-off period is increasing.

Preferably, said control means are further configured to increase said switch-on period if said second voltage is greater than a first voltage threshold, and regulate said switch-on period of said enabling signal based on said increased switch-on period.

Preferably, said control means are further configured to determine a fourth voltage indicative of the maximum value of said first voltage during said switch-off period, and stop the operating of said quasi-resonant inverter if said fourth voltage is greater than a second voltage threshold.

BRIEF DESCRIPTION OF THE DRAWINGS

These, and others, features and advantages of the solution according to the present invention will be better understood by reading the following detailed description of some embodiments thereof, provided merely by way of exemplary and non-limitative examples, to be read in conjunction with the attached drawings, wherein.

DETAILED DESCRIPTION OF THE INVENTION

Figure 1:
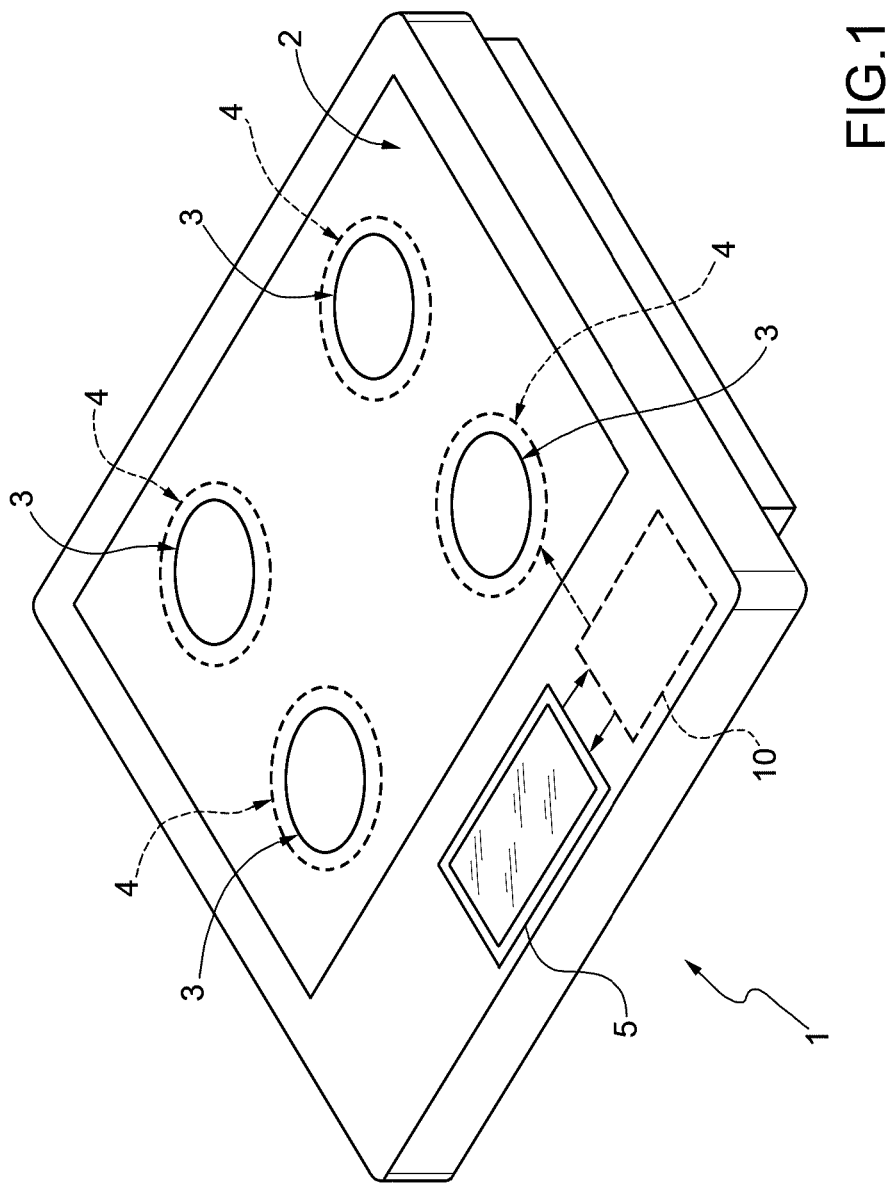
FIG. 1 is a schematic view illustrating an example induction-cooking appliance according to example embodiments of the present disclosure, FIG. 2 schematically shows a block diagram of an induction electronic control system, according to an example of the present disclosure, FIG. 3 schematically shows an example circuit diagram of a QR inverter circuit and a control unit of the induction electronic control system, according to example of the present disclosure.

Configurations shown in embodiments enumerated in the present specification and the drawings are just exemplary embodiments of the present disclosure, and it should be understood that there are various modified examples capable of replacing the embodiments of the present specification and the drawings at the time of filling the present application.

Throughout the following description similar reference numerals have been used to denote similar elements, parts, items of features, when applicable.

FIG. 1 illustrates an induction cooking appliance 1 according to example embodiment of the present disclosure. Induction cooking appliance 1 illustrated in FIG. 1 corresponds to an induction hob. The induction cooking appliance 1 comprises a cooking surface 2, preferably horizontal, i.e. a common hob plate, which is provided with a plurality of cooking zones 3.

The induction cooking appliance 1 further comprises a plurality of induction heating coils 4 which are associated with respective cooking zones 3. Induction heating coils 4 can be placed, for example, below the cooking surface 2 adjacent to respective cooking zones 3. It can be understood that induction cooking appliance 1 may comprise a plurality of induction heating coils 4 or a single induction heating coil 4. It can be further understood that induction hob is provided by way of example only. Indeed, the present disclosure can be used/applied with other kind of induction cooking appliances such as, for example, induction cooktops, induction oven, or any other similar induction cooking appliance.

The induction cooking appliance 1 may further comprise a user interface 5 designed to receive user input end/or providing information to the user. User interface 5 may be placed within a portion of the cooking surface 2, as shown. User interface 5 may be configured to receive a heating value/data indicative of a prefixed heating parameter, i.e. cooking-power/temperature, selected by the user. User interface 5 may be further configured to provide graphical cooking information to the user.

According to the present invention, the induction heating coils 4 are selectively operable to be fed by respective AC currents. The AC current is provided to an induction heating coil 4 by an electronic control system 10.

Figure 2:
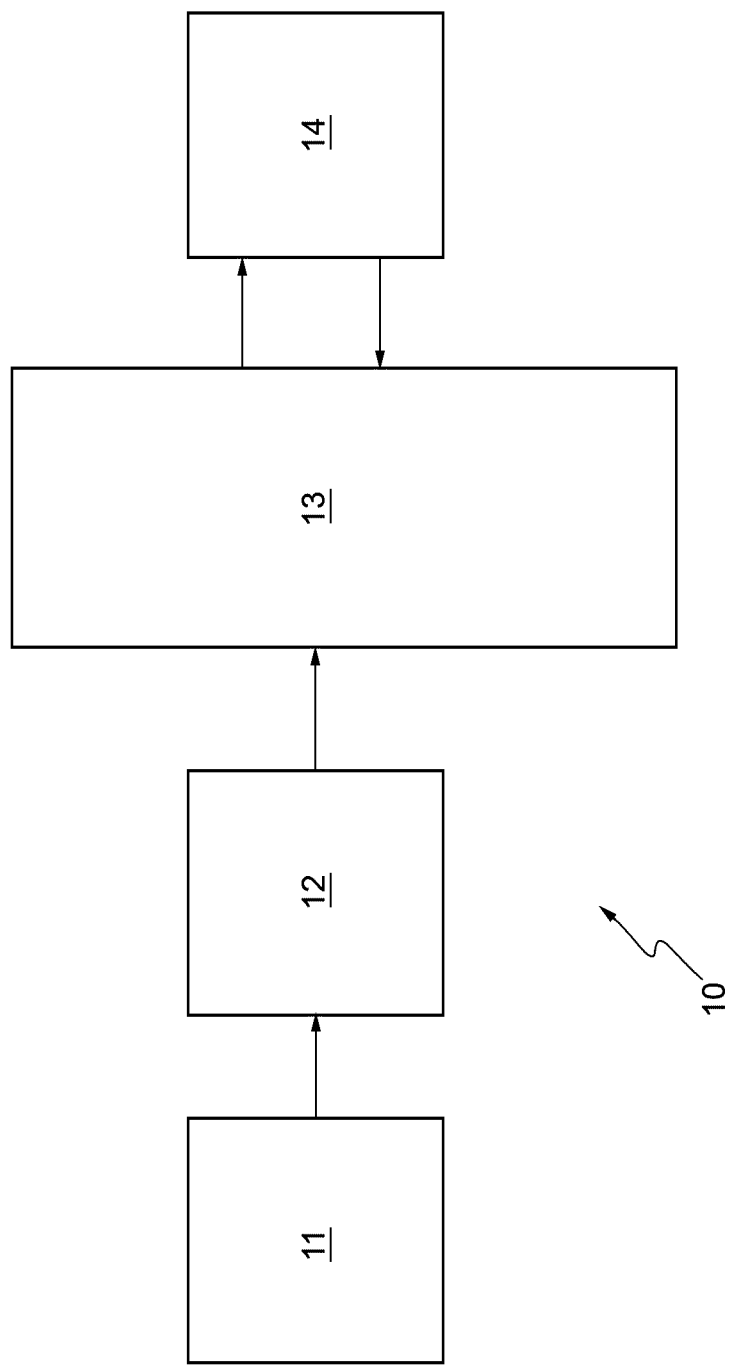

With reference to FIG. 2, the electronic control system 10 may comprise a power supply 11, a rectifier circuit 12, an inverter circuit 13, and a control unit 14. The control unit 14 is configured to control the inverter circuit 13 in order to regulate the electrical power provided to an induction heating coil 4, by implementing the phases of the control method hereinafter disclosed in detail.

The power supply 11 may be configured to supply electrical power to the induction cooking appliance 1. For example, the power supply 11 can be conveniently a two phase, 220 volt alternating current (AC) power supply. For example, the power supply may be provided to a residential property from an energy production source such as an electric utility. It is understood that in addition and/or alternatively, any other power source can be used such as for example, a one phase 110V power supply, or a three phase power supply 380 V and/or any other DC power source.

The rectifier unit 12 may be electrically connected between the power supply 11 and the inverter circuit 13. The rectifier unit 12 may be configured to convert the AC power signal provided by the power supply 11 into a rectified signal DC power signal to be provided to the inverter circuit 13. The rectifier unit 12 may comprise a diode full-bridge for full-wave rectification or a synchronous rectifier with a plurality of switching elements for active rectification and/or any similar rectification circuit.

The inverter circuit 13 is designed to feed AC current to the induction coil 4 of the induction cooking appliance 1. According to the preferred exemplary embodiment illustrated in FIGS. 2 and 3, the inverter circuit 13 is electrically coupled to the rectifier circuit 12 to receive in input the rectified signal.

The inverter circuit 13 is configured to convert the rectified signal provided by rectifier circuit 12 into high-frequency, AC high current signal to induction coil 4 to generate time-varying magnetic field for induction heating in the load (not illustrated) placed on the associated cooking zone 3 of the cooking appliance 1.

Figure 3:
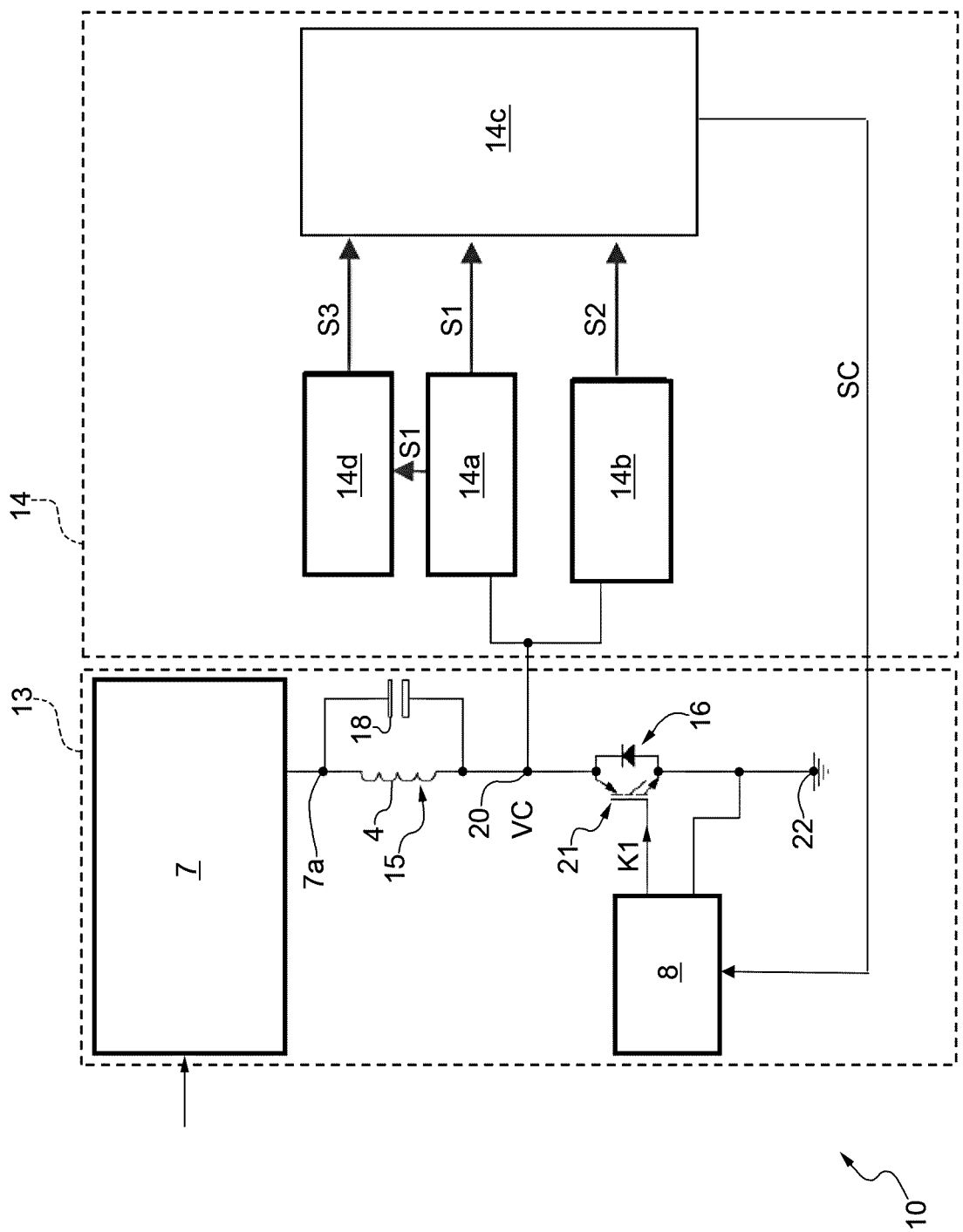

According to the preferred exemplary embodiment illustrated in FIG. 3, the inverter circuit 13 may comprise: a DC-link section 7, a resonant tank section 15, and a power switching section 16.

Since the DC-link 7 section is of known type, it will not be further described except to specify that it is electrically connected to the rectifier circuit 12 to receive the rectified signal and comprises a DC-link terminal 7a providing a DC voltage.

According to the preferred exemplary embodiment illustrated in FIG. 3, the resonant tank section 15 and the power switching section 16 comprise a quasi-resonant (so called QR) electric topology/architecture. So example aspects of the present invention are directed to a QR induction inverter circuit 13 of the cooking appliance 1.

The resonant tank section 15 may comprise a resonant capacitor 18 and the induction heating coil 4 associated with the cooking zone 3. According to the exemplary embodiment illustrated in FIG. 3, the resonant capacitor 18 and the induction heating coil 4 are mutually connected in parallel, between the DC-link terminal 7a and a circuit node 20.

The power switching section 16 comprises a driver unit 8 and a switching device. The switching device may be a power switching device 21 which is connected in series between the circuit node 20 and a neutral terminal 22.

Preferably, the neutral terminal 22 may be associated to the ground potential. The ground potential may be provided by the power supply 11.

According to the preferred embodiment illustrated in FIG. 3, the power switching device 21 may comprise an insulated-gate bipolar transistor (IGBT). The IGBT may comprise a collector terminal connected to the circuit node 20, a gate terminal for receiving an enabling signal K1 (hereinafter disclosed in detail), and an emitter terminal connected to the neutral terminal 22. It is understood that the present invention is not limited to insulated-gate bipolar transistor (IGBT), but it can be envisaged a power switching device 21 comprising any other similar switch, such as for example MOS, SIC MOS.

According to the preferred exemplary embodiment illustrated in FIG. 3, the power switching device 21 may further comprise a diode connected with the IGBT in antiparallel configuration. The power switching device 21 may operate in order to control operation of QR inverter circuit 13 such that current through induction heating coil 4 is controlled to have different shapes at different frequencies and different magnitudes.

The driver unit 8 is configured to receive a control command SC from the control unit 14 and provide the enabling signal K1 to the power switching device 21, based on the received control command SC.

According to the preferred embodiment of the present invention, the enabling signal 1 is a pulse signal, i.e. a signal comprising pulses, the driver unit 8 is configured to change/modulate frequencies and widths of the pulses based on the control signal SC. It is understood that frequency and/or widths of the pulses of the enabling signal K1 are controlled by the control unit 14 by means of the driver unit 8.

The enabling signal K1 is designed to cause the switching device 21 to switch-on or switch-off during one or more time periods, such that induction heating coil 4 produces a requested amount of output power. The control unit 14 controls the QR inverter circuit 13 so that the latter operates alternately in a plurality of charging phases and in a plurality of resonant phases.

Figure 5A:
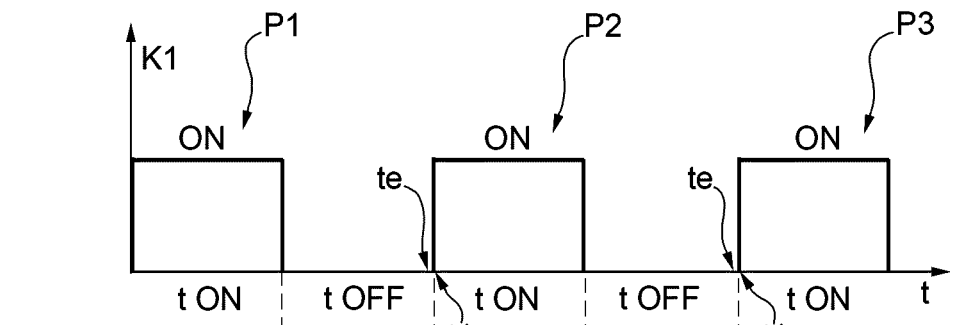
FIG. 5A illustrates an example of a pulse enabling signal provided to the switch device when the method suggested herein is performed.

During a charging phase the induction heating coil 4 stores energy. During a resonant phases the energy stored during the previous charging phase oscillates between induction heating coil 4 and resonant capacitor 18 to generate an alternating voltage signal. The charging phases can approximately correspond to the periods of time wherein the power switching device 21 is switched-on. It is understood that the power switching device 21 is switched-on for a period tON when the gate of the IGBT receive a pulse of the enabling signal Kl. It is further understood that the power switching device 21 is switched-off for a period tOFF when the gate of the IGBT does not receive a pulse of the enabling signal Kl. FIG. 5A illustrates an example of an enabling signal K1 with pulses and respective periods tON, and the tOFF periods between two consecutive pulses.

During a charging phase of inverter circuit 13, the power switching device 21 is switched-on during the period tON, to allow induction coil 8 to charge to a sufficient level. Vice-versa, the power switching device 21 is switched-off during the period tOFF to allow the energy stored in induction coil 8 during the period tON to oscillate between induction coil 4 and resonant capacitor 18, such that an alternating current signal is produced. More specifically, during the period tOFF, the oscillation of energy causes a oscillation voltage on the circuit node 20, hereinafter indicated with VC(t), which approximately corresponds to the voltage crossing the power switching device 21, i.e. the voltage-drop over the switching device 21.

Figure 5B:
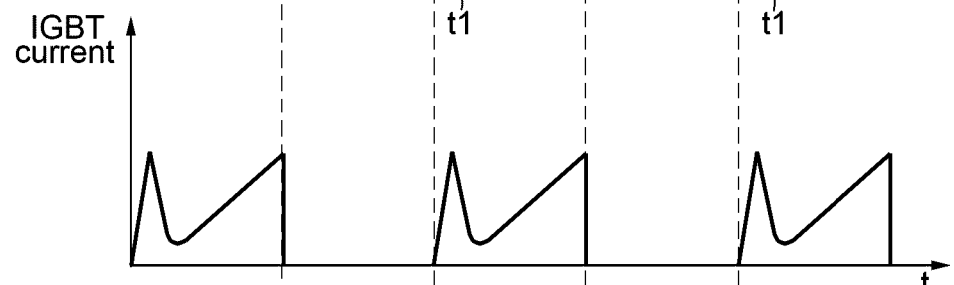
FIG. 5B illustrates an example of the current flowing through the switching device over time, when the switching device is controlled by the pulse enabling signal illustrated in FIG. 5A.
Figure 5C:
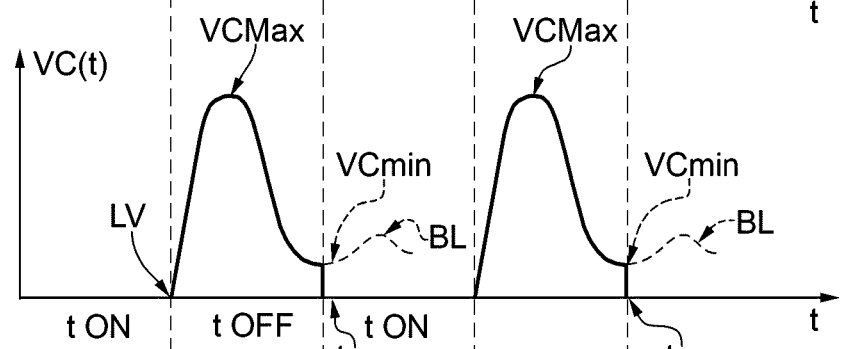
FIG. 5C illustrates an example of the voltage curves over time, which across the switching device during resonant periods thereof.

During the tON period, the voltage VC(t) has a low value LV, approximatively about zero Volt, because the power switching device 21 is switched-on and VC(t) corresponds about to the ground potential (FIG. 5C). It is understood that during the tON period, the IGBT current approximately changes as illustrated in FIG. 5B.

During the period tOFF, the voltage VC(t) approximatively oscillates as schematically illustrated in FIG. 5C. During the period tOFF, the voltage VC(t) changes so as to perform approximatively sinusoidal oscillations. The sinusoidal oscillations comprise a first half wave wherein: voltage VC(t) initially increases from the low value LV (approximately zero volt) (immediately after the end of the tON) to a peak value VCMax, which is the maximum value of oscillation during the period tOFF, and afterwards voltage VC(t) decreases from peak value VCMax to a minimum value VCmin and then tends to increase again (see broken line BL in FIG. 5C extending over tON).

In order to reduce the losses of the power switching device 21, the instant t1 of switching-on the power switching device 21 should be synchronized with the instant tm wherein the oscillating voltage VC(t) reaches its minimum value VCmin during the period tOFF. Therefore, in the preferred embodiment of the present invention, when the instants tl is different to instant tm, i.e. the switching-on of the power switching device 21 is performed in advance or in delay compared with the instant tm corresponding to the condition of minimum value VCmin of VC(t), the control unit 14 is configured to modify the period tOFF.

In order to perform this task, the control unit 14 is configured to: determine the minimum. value VCmin of the voltage VC(t) during the period tOFF, regulate by means of the driver unit 8, the period tOFF based on said voltage VCmin; and regulate the enabling signal K1 based on the determined period tOFF so that the instant tl is about the instant tm.

The Applicant has found that it is convenient to regulate the period tOFF in order to switch-on the power switching device 21 when the oscillating voltage VC(t) reaches its minimum value VCmin. Indeed, Applicant has found that the losses of a QR inverter circuit 13 depends on oscillating voltage VC(t) during period tOFF and can be strongly reduced if the power switching device 21 is switched-on when the oscillating voltage VC(t) has its minimum value VCmin. i.e. when tl=tm.

Figure 5D:
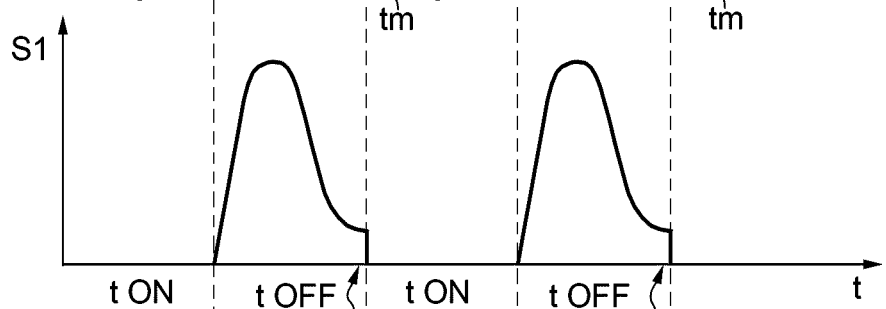
FIG. 5D illustrates an example of the voltage values/curves, which are determined by a first module based on voltage curves, illustrated in FIG. 5C.

According to preferred embodiment having the convenient electronic topology illustrated in FIG. 3, the control unit may comprise a detection circuit 14a, which is configured to provide a signal S1 indicative of the oscillating voltage VC(t) (FIG. 5D).

The control unit 14 may further comprise a detection circuit 14b, which is configured to provide a signal S2 indicative of the minimum value VCmin of the oscillating voltage VC(t) during the period tOFF.

The control unit 14 may further comprise a control circuit 14c, such as for example a microprocessor, configured to generate the command signal SC to control the driver unit 8 in order to regulate the pulses of the enabling signal K1. The control circuit 14c controls the enabling signal K1, more specifically change/regulate the period tOFF provided to the switching device 21 by means of the driver unit 8, so as to regulate the switch-off of the power switching device 21 itself, based on the signal S2.

The control circuit 14c may be further configured to control the enabling signal Kl, more specifically change/ regulate the periods tON, provided to the power switching device 21 by means of the signal S2 provided to the driver unit 8, so as to control the switch-on of the switching device 21 itself, based on the signal S1.

Preferably, detection circuit 14a may be electrically connected to the circuit node 20. According to a possible exemplary embodiment, the detection circuit 14a may be configured to sample the oscillating voltage VC(t) on the circuit node 20 during prefixed sampling times tsi (wherein i is a indicia of the samples). Preferably, detection circuit 14a may be configured to provide the electric signal S1 indicative of sampled values VC(tsi) of the oscillating voltage VC(t) measured in the sampling instants tsi. FIG. 5D illustrates a schematic example of the oscillating voltages VC(t) over periods tOFF determined by the detecting circuit 14a and provided to the control circuit 14c by means of the signal S1.

Figure 5E:
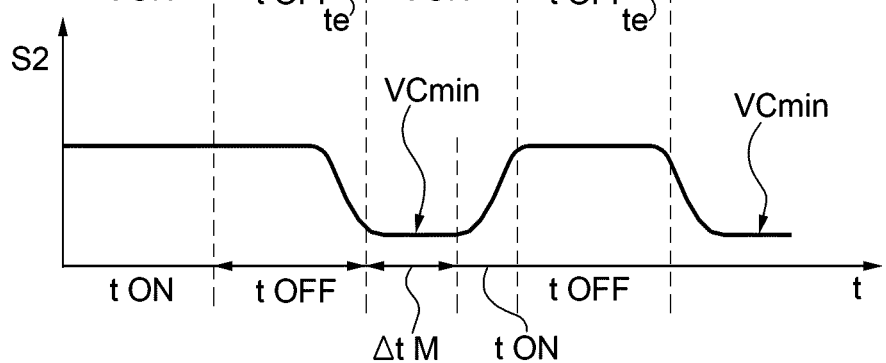
FIG. 5E illustrates an example of a minimum voltage curve over time provided by a second module based on based on voltage illustrated in FIG. 5C.

Preferably, detection circuit 14b may be electrically connected to the circuit node 20. According to a possible exemplary embodiment, detection circuit 14b may be configured to sample the oscillating voltage VC(t) on the circuit node 20 during prefixed sampling times tsi, and determining the minimum value VCmin of the oscillating voltage VC(t) during the period tOFF based on the sampled voltage VC(tsi). It is understood that in addition or alternatively, detection circuit 14b could receive the sampled voltage VC(ti) and/or the oscillating voltage VC(t) determined during the period tOFF, from the detection circuit 14a. Preferably, detection circuit 14b may be configured to provide the electric signal S2 indicative of the minimum. value VCmin. Preferably, the electric signal S2 provided to the control circuit 14c by detection circuit 14b may be an analogue signal wherein the minimum value VCmin is maintained for a prefixed period ΔTM which extends over the end of the period tOFF used for sampling the VC(t). FIG. 5E illustrates a schematic example of the signal S2 containing the minimum value VCmin determined during a period tOFF wherein the minimum value VCmin is maintained for the prefixed period ΔtM.

Applicant has found that extending the minimum value VCmin contained in the the signal S2 over the period tOFF for the prefixed period ΔtM, has the technical effect of reduce the computational speed needed to perform the tasks above disclosed. It follows that such tasks may be conveniently performed by a cheap microprocessor, without therefore affecting the cost of the electronic control system 10.

The control unit 14 may further comprise a detection circuit 14d, which is configured to receive the signal S1 indicative of the oscillating voltage VC(t) and provide a signal S3 to the control circuit 14c, indicative of the peak value VCMax of the oscillating voltage VC(t). For example the detection circuit 14d may be configured to elaborate the samples VC(tsi) in order to determine the maximum value sample corresponding to the peak value VCMax during the period tOFF.

It is understood that the electronic topology of the control unit 14 is not limited to the embodiment illustrated in FIG. 3 but other embodiments may be envisaged. For example, the control unit 14 may comprises a single microprocessor which includes detection circuits 14a, 14b, 14d and the control circuit 14c. In other words according to such embodiment all tasks are performed by a microprocessor.

Figure 4:
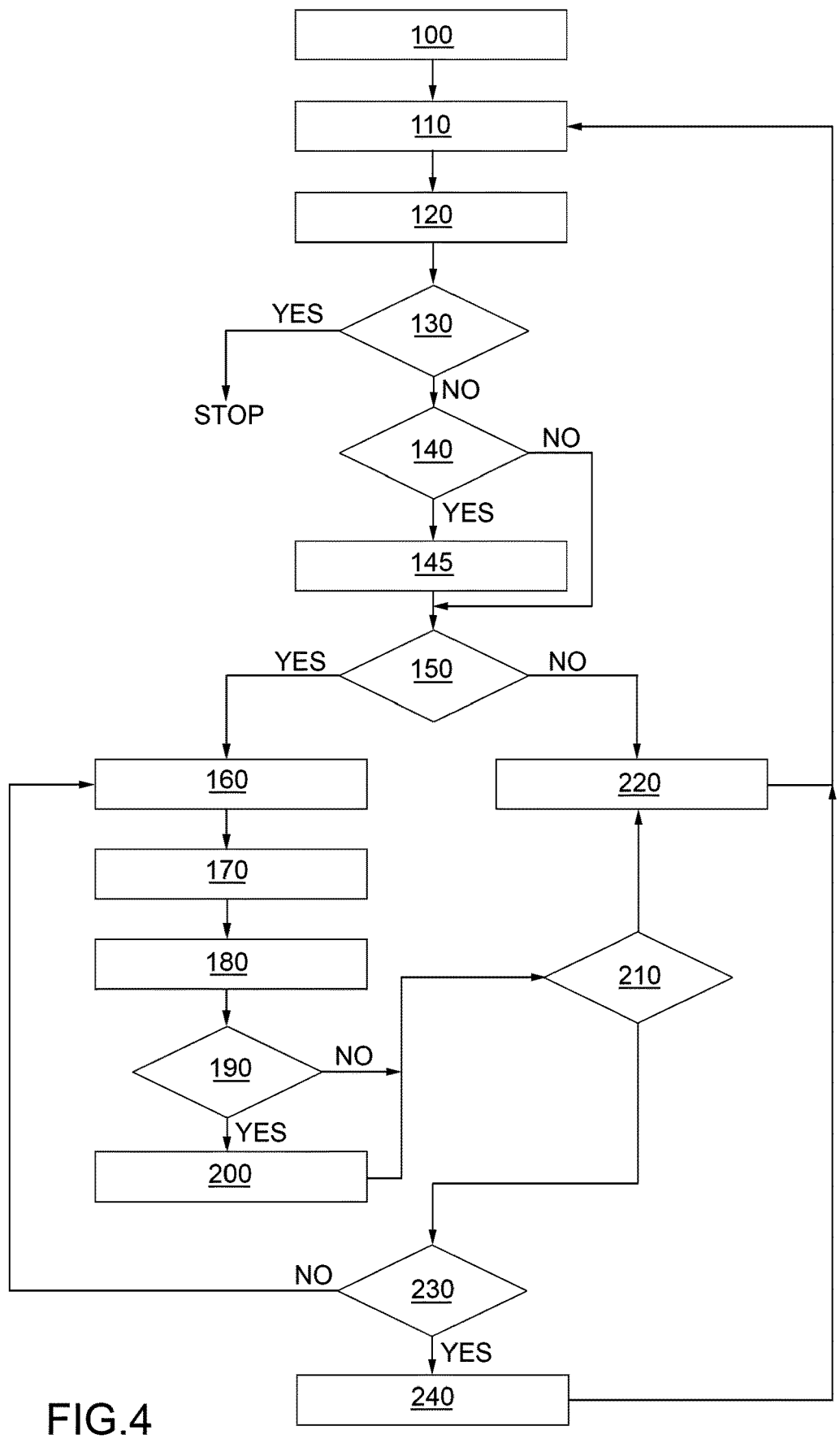
FIG. 4 shows a flow chart of an example method for controlling an induction electronic control system, according to the present invention.

FIG. 4 illustrates a flow chart of the control method 100 according to the present disclosure. Method 100 may be performed by the electronic control system 10.

A pulse of the enabling signal K1 (first pulse P1 on the left in FIG. 5A) can be provided to switch the power switching device 21 of the QR inverter circuit 13 in the induction cooking appliance 1 on and off for a period tON and a period tOFF (block 100). Initially the period tON and a period tOFF may have prefixed values. For example, period tON and a period tOFF may be determined based on user commands provided by the user interface 5. Period tON and a period tOFF may depend for example on cooking temperature and/or load.

During the tON period, the pulse (first pulse P1 in FIG. 5a) of the enabling signal K1 causes the power switching device 21 to switch-on, and the voltage VC(t) on the circuit node 20 has the low value LV (FIG. 5C).

The method waits for the period tOFF (block 110) (in FIG. 5A the first tOFF after first pulse P1).

During the period tOFF the switching device 21 is switched-off, and the voltage VC(t) oscillates (FIG. 5C). During period tOFF the method determines the voltage VC(t) (block 120). Preferably, in this phase, the control circuit 14c receives from the detection circuit 14a the signal S1 indicative of the oscillating voltage VC(t) (FIG. 5D). The method further determines the voltage VC(te) in the circuit node 20 about at the end of period tOFF, i.e. le last instant to of period tOFF immediately before the next period tON, i.e. before the instant tl of switching-on the IGBT.

The method 100 further determines the minimum value VCmin of the oscillating voltage VC(t) during the period tOFF. Preferably, the control circuit 14c may receive the signal S2, which is indicative of the minimum value VCmin from the detection circuit 14b (block 120).

Preferably, the method may further determine the maximum value VCMax of the voltage VC(t) during the period tOFF. In this step if the maximum value VCMax is greater than a voltage threshold TH1 (block 130), the method determines a critical resonance voltage, i.e. VCMax>=TH1, and stops the operating of the inverter circuit 13 (output YES from block 130).

If the method 100 does not determine a critical resonance voltage i.e VCMax<TH1 (output NO from block 130), the method 100 compares the minimum value VCmin with a voltage threshold TH2 (block 140). The voltage threshold TH2 can be determined based on the electric features of the switching device 21. Preferably, the voltage threshold TH2 may corresponds to a voltage that could cause the power switching device 21 to be damaged.

If the minimum value VCmin is greater than the voltage threshold TH2, (output YES from block 140), the method 100 increases the period tON to be used for the next pulse (P2 in FIG. 5A) of the enabling signal K1 (block 145). For example, the period tON may be incremented based on several procedures. For example, the period tON may be incremented based on the difference between the voltage VCmin and the threshold TH2 or based on a prefixed value.

If the minimum value VCmin is lower than, or equal to, the threshold TH2, (output NO from block 140), the method 100 controls whether voltage VC(te) on the circuit node 20 at the end of the period tOFF, i.e the instant te before t1, is greater than, or equal to, minimum value VCmin (block 150). The phase of block 150 is further performed if the minimum value VCmin is not greater than the voltage threshold TH2, (output NO from block 140).

If voltage VC(te) of the circuit node 20 at the end of the period tOFF, instant te, is lower than, or equal to, the minimum value VCmin, i.e. VC(te) <=VCmin, (output NO from block150) and the voltage Vc(t) is decreasing, the method 100 determines that period tOFF is correct and performs again the phases above disclosed in blocks 110, 120, 130, 140, 150. In this case, method 100 provides a new pulse (P2 in FIG. 5A) of the enabling signal K1 by maintaining the period tOFF unchanged (block 220).

If voltage VC(te) on the circuit node 20 at the end of the period tOFF is greater than the minimum value VCmin, i.e. (VC(te) >VCmin, (output Yes block 150) and the voltage Vc(t) is decreasing, the method determines that the power switch device 21 has been switched in advance of the instant tm, i.e. tl<tm. In this case, the method 100 increases the period tOFF of the enabling signal K1 and starts a new pulse (second pulse P2 in FIG. 5A) (block 160). The increasing of the period tOFF may be performed by several procedures. For example the period tOFF may be incremented based on the difference between VC(te) and VCmin or based on a prefixed value.

After performing the phase contained in the block 160, the method 100 performs the phase of waiting the next period tOFF after the last generated pulse (block 170) (in FIG. 5A the period tOFF after the pulse P2).

The method determines the voltage VC(t) during the period tOFF (block 180). Preferably, in this phase, the control circuit 14c may receive the signal S1 indicative of the voltage VC(t) from the detection circuit 14a.

The method further determines the voltage VC(te) in the circuit node 20 about at the end of tOFF, i.e. at the instant te immediately before the next tON (Block 180).

The method 100 further determines the minimum value VCmin of the oscillating voltage VC(t) during the period tOFF following the last pulse (P2 in FIG. 5A). Preferably, in this phase, the control circuit 14c may receive the signal S2 indicative of the minimum. value VCmin from the detection circuit 14b (block 180).

The method 100 compares the minimum value VCmin with the threshold TH2 (block 190). If the minimum. value VCmin is greater than the threshold TH2, (output YES from block 190), the method 100 increases the period tON of the next pulse of the enabling signal K1 (block 200) (pulse P3 in FIG. 5A).

If the minimum value VCmin is lower than or equal to the threshold TH2, (output NO from block 190), the method 100 controls whether the voltage VC(te) of the circuit node 20 at the end of the period tOFF (following the pulse P2 in FIG. 5A), i.e the instant te, is greater than minimum value VCmin (block 210). The phase of block 210 is further performed after the phase of the block 200.

If the voltage VC(te) of the circuit node 20 at the end of the period tOFF, instant te, is lower than, or equal to, the minimum value VCmin (VC(te) <=VCmin (output NO from block 210, the method 100 performs again the phases above disclosed for blocks 220, 110, 120, 130, 140, 150. In this case, method provides a new pulse of the enabling signal K1 by maintaining the last determined period tOFF unchanged (block 220) (pulse P3 in FIG. 5A).

If the voltage VC(te) of the circuit node 20 at the end of the period tOFF, instant te, is greater than the minimum value VCmin (VC(te) >VCmin (output YES from block 210), the method 100 checks if the voltage VC(t) on the circuit node 20 is increasing (block 230). For example, the increasing of the voltage Vc(t) may be determined based on signal S1 provided by detector circuit 14a.

If the voltage VC(t) on the circuit node 20 is decreasing (output NO from block 230), the method 100 performs again the phases of block 160, 170, 180, 190, 200, 210. If the voltage VC(t) on the circuit node 20 is increasing (output YES from block 230), the method 100 determines that the power switch device 21 has been switched on too late compared with the instant tm, i.e. tl>tm wherein the voltage VC(t) has its minimum value VCmin. In this case, the method decreases the period tOFF and starts a new pulse (block 240). The period tOFF may be decreased based on, for example a prefixed value, or based on difference between the VC(te) and minimum value VCmin.

The advantages of the present invention are the following: the electronic control system can lead a better efficiency and longer life of the switch device by reducing the losses and by using a simple and therefore cheap electronic architecture.

Clearly, changes and variations may be made to the cooking appliance, the method and the electronic system, however, departing from the scope of the present invention.

The invention claimed is:

1. A method to control a quasi-resonant inverter in an induction cooking appliance provided with at least an induction heating coil;
said quasi-resonant inverter comprises a switching device electrically connected to said induction heating coil by a node having a first voltage which is an oscillating voltage and is indicative of the voltage across said switching device,
the method comprising the steps of:
a) providing to said switching device an enabling signal comprising a plurality of pulses, in order to switch-on and switch-off said switching device for a switch-on period and a switch-off period,
b) determining a second voltage indicative of the minimum value of said first voltage during said switch-off period,
c) regulating said switch-off period based on said second voltage, and
d) regulating said enabling signal based on said regulated switch-off period,
wherein step b) further comprises:
b1) determining a third voltage indicative of the value of said first voltage at about the end of said switch-off period; and
wherein said step c) further comprises:
c1) increasing said switch-off period if said third voltage is greater than said second voltage and said first voltage is decreasing.

2. Method-The method according to claim 1, wherein:
said step c) further comprises:
c2) decreasing said switch-off period if said third voltage is greater than said second voltage and said first voltage is increasing.

3. The method according to claim 1, further comprising:
e) increasing said switch-on period if said second voltage is greater than a first voltage threshold, and
said step d) further comprising the step of regulating said switch-on period of said enabling signal based on said increased switch-on period.

4. The method according to claim 1, further comprising the steps of:
f) determining a fourth voltage indicative of the maximum value of said first voltage during said switch-off period,
g) stop the operating of said quasi-resonant inverter if said fourth voltage is greater than a second voltage threshold.

5. An electronic control system for controlling an induction heating coil of an induction cooking appliance, the electronic control system comprising:
a quasi-resonant inverter provided with: a switching device electrically connected to said induction heating coil by a node having a first voltage which is an oscillating voltage and is indicative of the voltage across said switching device, and a driver unit configured to provide to said switching device an enabling signal comprising a plurality of pulses, in order to switch-on and switch-off said switching device for a switch-on period and a switch-off period,
wherein said electronic control system comprises control means configured to control said driver unit in order to regulate said enabling signal, and
wherein said control means are further configured to:
determine a second voltage indicative of the minimum value of said first voltage during said switch-off period,
regulate said switch-off period based on said second voltage,
regulate said enabling signal based on said regulated switch-off period, determine a third voltage indicative of the value of said first voltage about at the end of said switch-off period, and
increase said switch-off period, if said third voltage is greater than said second voltage and said first voltage is decreasing.

6. The electronic control system according to claim 5, wherein said control means are further configured to decrease said switch-off period if said third voltage is greater than said second voltage and said first voltage is increasing.

7. The electronic control system according to claim 5, wherein said control means are further configured to:
increase said switch-on period if said second voltage is greater than a first voltage threshold, and
regulate said switch-on period of said enabling signal based on said increased switch-on period.

8. The electronic control system according to claim 5, wherein said control means are further configured to:
determine a fourth voltage indicative of the maximum value of said first voltage during said switch-off period, and
stop the operating of said quasi-resonant inverter, if said fourth voltage is greater than a second voltage threshold.

9. An induction cooking appliance comprising:
at least an induction heating coil,
a quasi-resonant inverter provided with: a switching device which is electrically connected to said induction heating coil by a node having a first voltage which is an oscillating voltage and is indicative of the voltage across said switching device, and a driver unit configured to provide to said switching device an enabling signal comprising a plurality of pulses, in order to switch-on and switch-off said switching device for a switch-on period and a switch-off period, and
an electronic control system comprising control means configured to control said driver unit in order to regulate enabling signal,
wherein said control means are further configured to:
determine a second voltage indicative of the minimum value of said first voltage during said switch-off period,
regulate said switch-off period based on said second voltage,
regulate said enabling signal based on said regulated switch-off period,
determine a third voltage indicative of the value of said first voltage about at the end of said switch-off period, and
increase said switch-off period, if said third voltage is greater than said second voltage and said first voltage is decreasing.

10. The induction cooking appliance according to claim 9, wherein said control means are further configured to decrease said switch-off period if said third voltage is greater than said second voltage and the first voltage is increasing.

11. The induction cooking appliance according to claim 9, wherein said control means are further configured to increase said switch-on period if said second voltage is greater than a first voltage threshold, and regulate said switch-on period of said enabling signal based on said increased switch-on period.

12. The induction cooking appliance according to claim 9, wherein said control means are further configured to determine a fourth voltage indicative of the maximum value of said first voltage during said switch-off period, and stop the operating of said quasi-resonant inverter if said fourth voltage is greater than a second voltage threshold.

13. An induction cooking appliance comprising:
  an induction heating coil;
  a quasi-resonant inverter comprising a solid state switch electrically connected to said induction heating coil at a node having a first voltage indicative of a voltage across said switch, the switch being configured to be in an ON state for a switch-on period and in an OFF state for a switch-off period in accordance with an enabling signal comprising a plurality of pulses;
  at least one detection circuit configured to:
    determine a second voltage indicative of a minimum value of said first voltage during said switch-off period;
    determine a third voltage indicative of a value of said first voltage at an end of said switch-off period; and
    determine a fourth voltage indicative of a maximum value of said first voltage during said switch-off period; and
  at least one controller configured to:
    regulate said switch-off period by increasing said switch-off period when said third voltage is greater than said second voltage and said first voltage is decreasing, and by decreasing said switch-off period when said third voltage is greater than said second voltage and said first voltage is increasing;
    regulate said switch-on period by increasing said switch-on period when said second voltage is greater than a first voltage threshold;
    regulate said enabling signal based on said regulated switch-off period and said regulated switch-on period;
    provide said regulated enabling signal to the switch; and
    stop operation of said quasi-resonant inverter when said fourth voltage is greater than a second voltage threshold.

14. The induction cooking appliance according to claim 13, wherein the at least one detection circuit and the at least one controller are integrated into a single microprocessor.

* * * * *